Patented Aug. 31, 1954

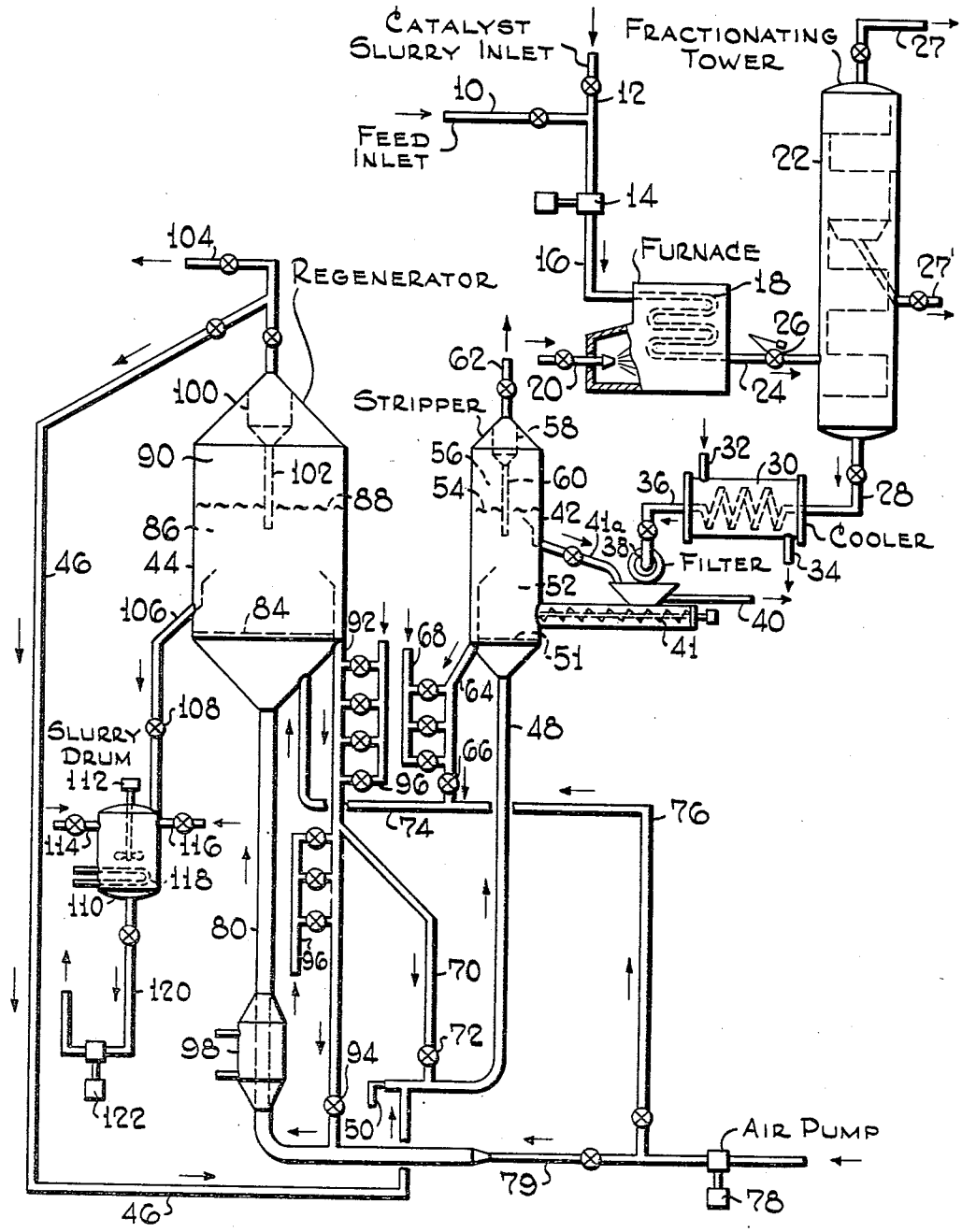

2,687,988

UNITED STATES PATENT OFFICE 2,687,988

REGENERATION OF OILY CONTACT SOLIDS

Reginald K. Stratford, Corunna, Ontario, and Bruce H. Mackenzie, Sarnia, Ontario, Canada, assignors to Standard Oil Development Company, a corporation of Delaware Application August 23, 1951, Serial No. 243,324

2 Claims. (Cl. 196—52)

This invention relates to a process for the catalytic conversion of hydrocarbons with high boiling points to hydrocarbons with low boiling points and more particularly, to a process for the regeneration of a catalyst used in said conversion process.

This application is a continuation-in-part of our co-pending application Serial No. 81,042, filed March 12, 1949, and now abandoned.

The suspensoid cracking process is well known in the art of gasoline manufacture. In this process, the hydrocarbon feed stock is mixed with a small amount of a solid catalytic substance, and the mixture subjected to both heat and pressure. As a result of this process, the hydrocarbons with high boiling points are cracked or converted to hydrocarbons with low boiling points. The reaction products are then separated in a separating zone and the catalyst is reclaimed. During the cracking process, the catalyst becomes contaminated with coke or carbonaceous deposits and, to maintain the activity of the catalyst at a practical level, it becomes necessary to regenerate it by burning off the coke in an oxygen-containing gas such as air. It is toward this regeneration process that this invention is directed.

In suspensoid cracking, the mixture of feed stock and catalyst is heated to cracking temperatures in a heating coil at superatmospheric pressures where the cracking operation takes place. From the heating coil, the products of the cracking operation are removed to a fractionating zone. The lighter fractions are removed from the upper levels of the fractionating zone for recovery of gas, gasoline and for further processing and the heavier condensate fractions containing the catalyst in the form of a slurry are removed from the bottom of the fractionating zone. This slurry is passed through a cooling zone and is then filtered. After filtration, the catalyst is in the form of an oily cake, the particles occluding oil from the slurry and carrying on them deposits of coke or carbonaceous materials from the cracking stage of the process. The separated oil constituent of the slurry is then removed for further treatment or for storage and the catalyst cake is passed through a screw conveyor called a "scroll" or by other mechanical conveying means to a regeneration zone.

Regeneration of catalyst in a fluidized state is desirable since it permits the establishing of a substantially uniform temperature throughout the mass of catalyst and enables the control of the temperature to be more exact. However, great difficulty has been heretofore encountered in the first stage of the regeneration process, in that the oily catalyst coming directly from the filter tends to become packed or agglomerated into compact masses due to the mechanical or even just gravitational compression in the screw conveyor or the like. As a result, such caked masses resist fluidization, retard stripping, and when introduced directly into a regenerator, make close temperature control difficult. Large amounts of hot stripping gas must be injected into such catalyst masses before the catalyst will become sufficiently dry to allow being fluidized and passed satisfactorily through the regeneration process without risk of overheating.

It is the object of this invention to provide for an improved process which overcomes the technical difficulties noted above.

The accompanying drawing illustrates diagrammatically one form of an apparatus suitable for carrying out the present invention.

This improved regeneration process is designed to operate in two stages; first, vaporization or stripping of the occluded oil from the catalyst leaving a dried substantially oil-free catalyst which carries a deposit of coke or carbonaceous materials from the cracking operation and second, the removal of those deposits by combustion in the presence of oxygen carried by a gas such as air, while recycling dry catalyst for admixing with the wet catalyst cake obtained on the filter.

The first stage of the regeneration process, the vaporization or stripping of the occluded oil from the catalyst, is preferably carried out with the catalyst in a fluidized state. This fluidized condition of the catalyst is created by passing a stream of hot, largely inert gases up through a mass of catalyst, the velocity of these gases being so selected that the particles are maintained in a fluidized bed having many of the characteristics of a liquid. A definite level of the fluidized bed will be established with the density of the zone above the bed level being substantially less than the density below the bed level. The hot gases passing through this fluid mass of catalyst vaporizes the occluded oil and strips these vapors from the catalyst as well as removing any other vapors or gases present. The temperature of the hot gases passing through the fluidized bed may vary from 600–1000° F. Especially in the upper portion of this range, some catalytic cracking will occur, the cracked vapors acting themselves to some extent as a stripping agent. However, to achieve the desired degree of stripping, steam, flue gases, nitrogen, light hydrocarbons such as methane, or the like may be utilized as an extraneous stripping gas, and preferably a small, controlled amount of air or oxygen is also desirably included in the stripping gas so as to facilitate maintaining the desired drying temperature when operating in accordance with the best embodiment of this invention.

Once the occluded oil is removed from the catalyst, the dried fluid catalyst mass having an oil content below 10%, preferably between about 0 and 6 wt. per cent based on dry catalyst, and a coke content of about 6 to 30 wt. per cent based on dry catalyst, is passed to the second stage of the regeneration process. Here the coke or other carbonaceous material that has been deposited on the surface of the catalyst in the cracking zone is removed by combustion with a gas containing oxygen such as air. This second stage of regeneration is also carried out with the catalyst in a fluidized state, the fluid catalyst mass being mixed with the oxygen-containing gas which is maintained at a velocity sufficient to maintain the catalyst particles in a fluidized bed. In this second stage of the regeneration process, the temperature is raised to about 1000° F. to 1150° F. The combustion gases are removed and the regenerated catalyst may be returned to storage or recycled for reuse in the cracking step.

In accordance with this invention, the stripping stage and the subsequent burning or regeneration stage may be carried out in separate vessels or in different zones within the same vessel. However, regardless of the foregoing, it is of the essence in the present invention that a portion of hot dried catalyst from which the occluded oil has been substantially removed in the drying zone, and from which coke may have been burned off thereafter in the regeneration zone, be recycled from the drying zone or from the regeneration zone to the screw conveyor for admixing with and dispersion in the wet catalyst from the filter, so as to reduce the oil content of the resulting mixture.

The recycling of the hot dried catalyst, which is preferably unregenerated catalyst from the stripping zone, for admixing with the wet catalyst cake from the filter prevents packing or agglomeration of the catalyst in the conveyor into coherent masses and thereby eventual fluidization of the oily catalyst is facilitated. The addition of the stripping gas into the drying or stripping zone vaporizes the occluded oil and strips the vapors from the catalyst particles. Moreover, the admission to the drying zone of controlled amounts of about 0 to 12 vol. per cent of oxygen or an equivalent amount of air or the like based on the volume of inert stripping gas used, or about 0 to 100 wt. per cent of oxygen based on the oil occluded in the catalyst being dried, permits a small portion of the oil vapors there present to burn under controlled conditions, thus maintaining the temperature required for vaporization of the occluded oil without the addition of unduly great quantities of hot stripping gas as is ordinarily necessary, and without risking exposure of the catalyst to excessive temperatures such as occur in the combustion of catalyst-containing high local concentrations of oil.

Referring to the drawing, an oil feed stock enters the process through line 10. The desired amount of a catalyst, ranging between about 0.5 and 20 wt. per cent on hydrocarbon feed, either in powdered form or in the form of a slurry of catalyst in oil or catalyst in water is added to line 10 through line 12. The feed stock may be any hydrocarbon oil such as light or heavy naphtha, gas oil, overhead or distillate stock or a mixture of the same in any proportion. The catalyst used may be any of the natural clays, such as fuller's earth or bentonite, and preferably clays which have been activated with hydrochloric acid, sulfuric acid or hydrofluoric acid and thus come within the class of acid activated natural earths; or the catalyst may be any of the synthetic earths, such as the gels of silica, activated alumina, coprecipitated gels, containing silica and alumina or silica and magnesia and the like. These gels may be used alone or they may be modified by the addition of one or more metal agents containing, for example, nickel, iron, cobalt, magnesium, vanadium, chromium, molybdenum, tungsten, zirconium, their oxides and the like. The catalyst may be in the form of a powder of the size from 100 to 400 mesh or finer.

The mixture of oil and catalyst is raised to a pressure of about 300 to 1,000 p. s. i. g. by means of pump 14. The pressurized mixture then passes through line 16 into a reaction zone such as coil 18 where it is raised to a temperature of from about 800 to 1100° F. by means of burner 20. The rate of feed of mixture of cracking stock-catalyst into the system may vary from about 6.5 to 10.7 volumes of liquid mixture per volume of the treating coil per hour. It is in this reaction zone that the conversion hydrocarbons with high boiling points to hydrocarbons with low boiling points occurs.

The cracked oil mixture then passes into a fractionating tower 22 through line 24. Line 24 contains a pressure release valve 26 by means of which the cracked oil and catalyst mixture is reduced to 40–125 p. s. i. g. depending on pressure desired in fractionating system.

In the fractionating tower, separation of the fractions resulting from the cracking process takes place in a known manner, the low boiling constituents being removed from the top and middle of the fractionating tower through lines 27 and 27' respectively and the heavier or high boiling constituents are collected at the bottom. These higher boiling constituents carry with them catalyst used in the process. This mixture of heavy constituents and catalyst which is at a temperature of about 650° F. to 750° F. is removed from the bottom of the fractionating tower through line 28. It is then passed through a cooling means, such as coil 30, which is surrounded by a water bath with inlet at 32 and outlet at 34. Here the temperature of the oil-catalyst mixture is lowered to about 450° F. to 500° F. From the cooling coil, the mixture is then passed through line 36 into rotary filter 38, other types of filters such as tar accumulators and strippers being applicable to the filtering operation. The heavy constituents, freed from the catalyst, are removed through line 40 for further processing.

The wet catalyst from filter 38, which may contain between about 15 and 60 wt. per cent of oil, is mixed with about 25 to 600 wt. per cent of dry catalyst withdrawn through line 41a from stripper 42 or through a similar line from regenerator 44. The resulting catalyst mixture containing an average oil content between about 1 and 10 wt. per cent based on dry catalyst is then transported by screw conveyor 41 to the stripper or drying unit 42. Instead of using a screw conveyor as in the present embodiment, any other mechanical transferring means such as a belt conveyor or the like may be used, provided, however, that a mechanical mixing means, such as a kneader or the like, is included in the process so as to assure proper dispersion of the dry catalyst in the filter cake without leaving high local concentrations of oil in any part of the catalyst mixture being introduced into the stripper.

It is within this stripper, vessel 42, that the first stage of the regeneration process occurs. In vessel 42, the occluded oil is removed from the used catalyst leaving a dried, substantially oil-free catalyst which carries on its surface a deposit of coke or carbonaceous material from the cracking operation. The removal of the occluded oil from the catalyst is brought about by maintaining a temperature within vessel 42 within a range of from 600–1000° F. to vaporize the occluded oil and by passing a stripping gas upwardly through the vessel to remove the vapors from it.

As previously mentioned, various gases may be used as stripping gases either separately or in combination. Hot combustion gases from the regeneration zone or vessel 44 may be introduced through lines 46 and 48 and into vessel 42, or steam may be utilized as a stripping gas and may be introduced into vessel 42 through lines 50 and 48. Also, small amounts of an oxygen-containing gas, such as air, are preferably injected through lines 50 and 48 so as to aid in attaining and maintaining the desired stripping temperature by combustion of a limited amount of the vaporized hydrocarbons within vessel 42.

The gases entering the stripping vessel 42 pass through a distributing zone or grid member 51 located at the bottom of vessel 42 and are equally distributed throughout the vessel.

The velocity of the gases passing upwardly through vessel 42 are so selected that the catalyst particles are maintained in a fluidized bed 52 having many of the characteristics of a liquid. The fluidized bed has a level as indicated at 54 and will have a density within the range of from 15–40 pounds per cubic ft. depending on the catalyst used and the conditions of the operation. Zone 56 above the fluidized bed will have a density of between about 0.003 to 0.120 pound per cubic ft. also depending on the catalyst and the conditions in the zone. The height of bed 52 may be varied as desired by withdrawing the dense phase catalyst directly from the bed. A linear superficial velocity of the gases flowing upward through fluidized bed 52 of about 0.5 to 3.0 ft. per second may be used where the catalyst is in a powdered form.

The vaporized oil and any burned gases pass into cyclone separator 58 at the top of vessel 42 where the catalyst entrained in the gas stream is separated and deposited in the fluid catalyst bed 52 beneath the fluid level 54 by means of dip pipe 60. The vapors and burned gases pass from cyclone separator 58 through line 62 and may be processed to reclaim the vaporized oil if desired.

Stripping vessel 42 is equipped with a downcomer or standpipe 64. This standpipe extends upward into vessel 42 above the level of the grid member 51 and is provided at its lower end with a slide valve 66. The column of fluidized catalyst above the slide valve 66 is kept in a fluid state by injections of a fluidizing gas, such as combustion gas, steam, etc. through fluidizing lines 68. The downcomer or standpipe 64 is for removing the hot dried spent catalyst from stripping vessel 42. By regulating slide valve 66, desired amounts of catalyst may be removed directly from the dense bed of fluidized catalyst 52.

In order to aid in regulating the temperature of the catalyst in stripping vessel 42, provision is made for recycling hot regenerated catalyst from the regenerating zone 44 to stripping zone 42. In this manner, regeneration heat is utilized for stripping out as much recoverable oil as possible, without requiring unnecessary combustion of the oil such as occurs where wet catalyst is passed directly to a regenerator or where combustion of the occluded oil is relied on as the principal means for maintenance of the desired stripping temperatures. In the present embodiment of the invention, recycling of hot catalyst from regenerator 44 is accomplished through standpipes 92 and 70, rate-regulating slide valve 72 and transfer line 28. Standpipe 70 joins transfer line 48 at a point such that the gas stream, whether hot combustion gases through line 46 or steam or an oxygen-containing gas such as steam diluted with air through line 50, transports the resulting dispersion of hot regenerated catalyst to vessel 52.

By means of line 74, hot dried spent catalyst is transported from standpipe 64 into the bottom portion of regenerating vessel 44. Air from line 76 and pump 78 is used for the transporting medium.

Air or other oxygen-containing gas is passed from line 76 into lines 79 and 80 and introduced into the bottom of regenerator 44 through grid member 84 to cause combustion of the coke deposits which contaminate the spent catalyst. This grid located at the bottom of vessel 84 insures complete distribution of the gases entering vessel 44 through line 80.

The velocity of the oxygen-containing gas, such as air, entering the regenerator 44 is so selected that the catalyst particles entering regenerator through line 74 are maintained as a fluidized bed 86 having a level indicated at 88, with a more disperse phase 90 thereabove. The liquid-like characteristics of the dense fluidized bed, as well as its apparent density and that of the superimposed disperse phase are substantially the same as previously described in connection with stripper 42. The height of the bed again may be varied as desired by withdrawing dense phase catalyst directly from bed 86. The superficial velocity of the air through line 80 should be from about 15 ft. to 35 ft. per second when the catalyst is in the powdered form.

The regenerator 44 is equipped with standpipe 92 for withdrawing hot regenerated catalyst directly from dense bed 86. This standpipe extends upward into vessel 44 above the level of grid member 84 and is equipped with slide valve 94 for regulating the amount of catalyst withdrawn from the dense bed. Fluidizing lines 96 are utilized for injections of an aeration gas such as air, steam, flue gas, etc. in order to maintain the withdrawn catalyst in a flowable condition in the standpipe.

A portion of the catalyst withdrawn through standpipe 92 and slide valve 94 may be introduced into line 80 where it is recirculated to the regenerator. Line 80 also may be equipped with a heat exchanger 98 for removing heat from the catalyst circulated through standpipe 92, slide valve 94 and line 80. This recycle feature enables accurate control of the temperature of the fluidized bed 86. If desired heat exchanger 98 may be placed in standpipe 92 instead of in line 80 or heat exchangers may be inserted both in line 80 and standpipe 92.

A portion of the hot catalyst withdrawn through standpipe 92 is preferably withdrawn through line 70 and recirculated through line 48 and into stripper 42 as described above, so as to allow maximum recovery of oil from the wet catalyst.

The temperature of the fluidized bed 86 is maintained about 1000° to 1150° F. or 1250° F., depending on the known deactivation temperature of the catalyst used, and remains substantially uniform throughout. Within this temperature range, coke or carbonaceous deposits upon the surfaces of the catalyst particles which were deposited there in the cracking operation are burned off. The burned gases leaving bed 86 enter cyclone separator 100 where the entrained catalyst is separated from the gases and deposited by means of dip pipe 102 beneath the bed level 88. Burned gases enter line 104 and the portion that is not recirculated through line 46 and into line 48 is vented.

Regenerator vessel 44 is equipped with a withdrawal line 106 which may be equipped with fluidizing lines if desired. Line 106 is equipped with a valve 108 which may be used to regulate the amount of regenerated catalyst withdrawn from the dense bed 86 through line 106 and introduced into slurry drum 110. This slurry drum is equipped with agitator 112. Oil which may be a portion of the feed, or water, if desired, is introduced into the slurry drum through line 114. Additional fresh catalyst may be added to the slurry drum through line 116, and the temperature of the slurry of oil and catalyst may be regulated by means of cooling coil 118.

The resulting slurry of oil and catalyst may then be withdrawn from slurry drum 110 through line 120 and pumped by pump 122 either to storage or recycled through line 12 for reuse in the process.

Having given a full description of the invention and specific examples of the manner and process of using it, it will be understood that the invention is not limited thereto, but that it can be varied by persons skilled in the art without departing from the spirit of the present disclosure or from the scope of the appended claims.

What is claimed is:

1. In a suspensoid cracking process wherein finely divided solid catalyst particles are mixed with a hydrocarbon feed, the resulting mixture is passed through an elongated reaction zone of restricted cross-section at a conversion temperature of about 800–1100° F. and at a pressure of about 300–1000 lbs./sq. in. gage, the pressure on the converted products is reduced, the products are introduced into a fractionation zone, a relatively low boiling hydrocarbon is recovered from an upper portion of the fractionation zone and a heavy condensate fraction containing the catalyst is withdrawn from the bottom of the fractionation zone, the improvement which comprises cooling the catalyst-containing condensate fraction to a temperature between 450 and 500° F., filtering the cooled fraction to separate the heavy condensate and catalyst particles containing occluded oil, mixing the resulting oily catalyst with hot dry catalyst particles to facilitate eventual fluidization of the mixture, transferring the mixture of dry and oily catalyst particles by mechanical pressure to a drying and stripping zone maintained at a temperature between 600 and 1000° F. and compacting the catalyst mixture during the transfer, mixing the compacted mixture of dry and oily catalyst particles in the drying zone with hot regenerated particles to make the catalyst fluidizable, passing a stripping gas upward through the drying zone at such a velocity that the catalyst particles are maintained as a fluidized mass comprising a dense phase superimposed by a dilute phase, passing a small amount of an oxygen-containing gas to said drying zone, withdrawing the resulting dried catalyst particles from the dense phase of the drying zone and passing them into a regeneration zone maintained at a temperature of about 1000–1150° F., passing an oxygen-containing gas upward through the dried catalyst particles in the regeneration zone and maintaining them as a dense fluidized phase with a dilute phase thereabove, withdrawing regenerated catalyst particles from the regeneration zone and returning them to the process.

2. In a process for converting hydrocarbons with high boiling points to hydrocarbons with low boiling points by adding a finely divided solid catalyst to a hydrocarbon feed, cracking the mixture at a cracking temperature under superatmospheric pressure whereby coke is deposited on the catalyst particles, separating the resulting cracked products in a fractionating zone into a lower boiling fraction and a higher boiling condensate fraction, treating the condensate fraction for reclamation of the catalyst contained therein, the improvement which comprises passing the condensate fraction which contains the catalyst through a cooling zone, filtering the cooled condensate fraction to recover oily wet catalyst as a filter cake therefrom, mechanically mixing the oily wet catalyst filter cake with hot dry finely divided catalyst to form a homogeneous mixture without leaving high local concentrations of oil in the mixture, mechanically transferring said homogeneous mixture into a separate drying zone and compacting it during the transfer, passing a hot stripping gas upward through the drying zone for vaporizing and removing the oil occluded by the catalyst to dry the catalyst particles and for maintaining the dried catalyst particles as a fluidized mass comprising a dense phase with a less dense phase thereabove, said stripping gas including an oxygen-containing gas for burning at least part of the oil removed in the drying zone, withdrawing the dried spent catalyst from the bottom of the drying zone, passing dried spent catalyst into a regeneration zone, passing an oxygen-containing gas upward through the regeneration zone for burning coke from the catalyst and for maintaining the catalyst as a fluidized mass comprising a dense phase with a less dense phase thereabove, and withdrawing the regenerated catalyst from the regeneration zone and returning it for reuse in the process.

References Cited in the file of this patent

UNITED STATES PATENTS

| Number | Name | Date |
|---|---|---|
| 2,313,940 | Hirsch | Mar. 16, 1943 |
| 2,389,236 | Payne | Nov. 20, 1945 |
| 2,451,619 | Hengstebeck et al. | Oct. 19, 1948 |
| 2,457,255 | McElherne | Dec. 28, 1948 |
| 2,490,993 | Borcherding | Dec. 13, 1949 |
| 2,517,900 | Loy | Aug. 8, 1950 |